(12) United States Patent
Hannuksela

(10) Patent No.: US 7,006,576 B1
(45) Date of Patent: Feb. 28, 2006

(54) VIDEO CODING

(75) Inventor: Miska Hannuksela, Tampere (FI)

(73) Assignee: Nokia Mobile Phones Limited, Espoo (FI)

( * ) Notice: Subject to any disclaimer, the term of this patent is extended or adjusted under 35 U.S.C. 154(b) by 1011 days.

(21) Appl. No.: 09/619,660

(22) Filed: Jul. 19, 2000

(30) Foreign Application Priority Data

Jul. 19, 1999 (GB) .............................. 9916909

(51) Int. Cl.
*H04N 7/12* (2006.01)

(52) U.S. Cl. ............................... 375/240.27
(58) Field of Classification Search ............ 375/240.27, 375/240.02, 240.12, 240.18, 240.24; 348/384.1, 348/390.1, 425.1, 425.2, 420.1, 469, 384, 348/390; H04N 7/12
See application file for complete search history.

(56) References Cited

U.S. PATENT DOCUMENTS

| | | | | |
|---|---|---|---|---|
| 5,168,356 A | * | 12/1992 | Acampora et al. | ..... 375/240.15 |
| 5,289,276 A | | 2/1994 | Siracusa et al. | |
| 5,333,137 A | * | 7/1994 | Fujiyama | ..................... 714/821 |
| 5,416,600 A | * | 5/1995 | Matsumi et al. | ............ 386/112 |
| 5,528,284 A | * | 6/1996 | Iwami et al. | ............ 348/14.15 |
| 5,550,847 A | * | 8/1996 | Zhu | ........................... 714/748 |
| 5,614,958 A | * | 3/1997 | Shikakura | .................... 348/616 |
| 5,754,605 A | * | 5/1998 | Chong et al. | ................ 375/368 |
| 5,912,902 A | * | 6/1999 | Monroe | ....................... 714/746 |
| 6,301,637 B1 | * | 10/2001 | Krull et al. | .................. 711/112 |
| 6,310,897 B1 | | 10/2001 | Watanabe et al. | |
| 6,530,055 B1 | * | 3/2003 | Fukunaga | ................... 714/746 |
| 6,631,485 B1 | * | 10/2003 | Morley et al. | .............. 714/701 |

FOREIGN PATENT DOCUMENTS

| | | |
|---|---|---|
| CA | 2306971 | 2/2003 |
| CA | 2377865 | 11/2003 |
| EP | 0579075 A2 | 1/1994 |
| EP | 0 844 792 A | 5/1998 |
| EP | 0 844 792 A2 | 5/1998 |
| EP | 0844792 | 4/2003 |
| GB | 2209256 | 5/1989 |

OTHER PUBLICATIONS

Liang, J., et al: "Tools for Robust Image and Video Coding in JPEG 2000 and MPEG4 Standards", Proceedings of SPIE, Jan. 1999, XP000933619, pp. 40–51.

Bormann et al: Network Working Group: RTP Payload Format for the 1998 Version of ITU–T Rc. H.263 Video (H.236+), Request for Comments 2429, Online!, Oct. 1, 1998, XP002150428, Retrieved from the Internet: URL:ftp://ftp.isi.edu/in-notes/rfc2429.txt retrieved on Oct. 18, 2000, pp. 1–17.

(Continued)

*Primary Examiner*—Nhon Diep
(74) *Attorney, Agent, or Firm*—Antonelli, Terry, Stout & Kraus, LLP

(57) ABSTRACT

A method of video encoding including: receiving a video signal to be coded; coding data representing a frame of said video signal; and repeating part, but not all, of the data. The repeated part including the picture header for the frame. A method of decoding an encoded video signal including receiving coded data representing frames of a video signal; examining the coded data to detect header data and picture data; when an error in the picture header is detected, storing the picture data in a temporary picture data store, detecting a repeat of the header data; and decoding the stored picture data using the repeated header data.

36 Claims, 9 Drawing Sheets

OTHER PUBLICATIONS

Faerber, N., et al: "Extensions of ITU–T Recommendation H.324 for Error–Resilient Video Transmission", IEEE Communications Magazine, US, IEEE Service Center, Piscataway, N.J. vol. 36, No. 6, Jun. 1, 1998, pp. 120–128, XP000777794, ISSN: 0163–6804.

Cote, G., et al: "H.263+: Viceo Coding at Low Bit Rates", IEEE Transactions on Circuits and Systems for Video Technology, US, IEEE Inc. New York, vol. 8, N. 7, Nov. 1, 1998, pp. 849–866, XP000790131, ISSN: 1051–8215.

Cote et al., "H.263+: Video Coding at Low Bit Rates", IEEE Transactions on Circuits an dSystems for Video Technology, vol., 8, No. 7, pp. 49–66, Nov. 1998.

Liang et al., "XP–000933619 Tools for Robust Image and Video Coding in JPEG2000 and MPEG4 Standards", SPIE vol. 3653, pp. 40–51, Jan. 1999.

Bormann et al., "XP–002150428 RTP Payload Format for the 1998 Version of ITU–T Rec. H.263 Video (H.263+)", pp. 1–12, Oct. 1998.

* cited by examiner

VIDEO CODING

BACKGROUND OF THE INVENTION

This invention relates to video encoding and decoding.

One of the recent targets in mobile telecommunications has been to increase the speed of data transmission to enable incorporation of multimedia services to mobile networks. One of the key components of multimedia is digital video. Transmission of video comprises a fairly continuous traffic of data representing moving pictures. As is generally known, the amount of data needed to transfer pictures is high compared with many other types of media, and so far usage of video in low bit-rate terminals has been negligible. However, significant progress has been achieved in the area of low bit-rate video compression. Acceptable video quality can be obtained at bit-rates around 20 kilo bits per second. As a result of this progressive reduction in bit-rate, video will be a viable service to offer over channels such as mobile communications channels.

A video sequence consists of a series of still images or frames. Video compression methods are based on reducing the redundancy and perceptually irrelevant parts of video sequences. The redundancy in video sequences can be categorised into spatial, temporal and spectral redundancy. Spatial redundancy means the correlation between neighbouring pixels within a frame. Temporal redundancy means the correlation between areas of successive frames. Temporal redundancy arises from the likelihood of objects appearing in a previous image also appearing in the current image. Compression can be achieved by generating motion compensation data which describes the motion (i.e. displacement) between similar areas of the current and a previous image. The current image is thus predicted from the previous one. Spectral redundancy means the correlation between the different colour components of the same image.

Video compression methods typically differentiate between images which do or do not utilise temporal redundancy reduction. Compressed images which do not utilise temporal redundancy reduction methods are usually called INTRA or I-frames whereas temporally predicted images are called INTER or P-frames (and also B-frames when the INTER frames may be predicted in a forward or backward manner). In the INTER frame case, the predicted (motion-compensated) image is rarely precise enough and therefore a spatially compressed prediction error image is also a part of each INTER frame.

However, sufficient compression cannot usually be achieved by just reducing the redundancy of the video sequence. Thus, video encoders try to reduce the quality of those parts of the video sequence which are subjectively the least important. In addition, the redundancy of the encoded bitstream is reduced by means of efficient lossless coding of compression parameters and coefficients. The main technique is to use variable length codes.

Compressed video is easily corrupted by transmission errors, mainly for two reasons. Firstly, due to utilisation of temporal predictive differential coding (INTER frames), an error is propagated both spatially and temporally. In practice this means that, once an error occurs, it is easily visible to the human eye for a relatively long time. Especially susceptible are transmissions at low bit-rates where there are only a few INTRA-coded frames (the transmission of INTRA-coded frames would terminate the temporal error propagation). Secondly, the use of variable length codes increases the susceptibility to errors. When a bit error alters a codeword to another one of different length, the decoder loses codeword synchronisation and also decodes subsequent error-free codewords (comprising several bits) incorrectly until the next synchronisation or start code. (A synchronisation code is a bit pattern which cannot be generated from any legal combination of other codewords.)

One of the inherent characteristics of wireless data transmission is a relatively high bit error probability. This problem can be addressed by various transport, network and link layer retransmission schemes. However the drawback of such schemes is the possibility of unlimited and fluctuating transmission delays. In conversational audio-visual services, it is unacceptable to have large end-to-end delays. Thus retransmission schemes cannot be used in such services. Instead one must try to detect and conceal the transmission errors. In streaming audio-visual retrieval services, the transmission delay may vary somewhat due to the fact that some initial buffering occurs before the start of play-back. However, the maximum acceptable transmission delay is fixed and, if exceeded, there is an annoying pause in the play-back. In practice, both reliable and unreliable transport channels are used in retrieval services.

Every bit in a compressed video bitstream does not have an equal importance to the decompressed images. Some bits define vital information such as picture type (e.g. INTRA or INTER), quantiser value and optional coding modes that have been used. ITU-T Recommendation H.263 relates to video coding for low bit-rate communication. In H.263, the most vital information is gathered in the picture header. A transmission error in the picture header typically causes a total misinterpretation of the subsequent bits defining the picture content. Due to utilisation of temporal predictive differential coding (INTER frames), the error is propagated both spatially and temporally. Thus, a normal approach to picture header corruption is to freeze the previous picture on the screen, to send an INTRA picture request to the transmitting terminal and to wait for the requested INTRA frame. This may cause an annoying pause in the received video, especially in real-time conversational video sequences.

Transmission errors have a different nature depending on the underlying network. In packet-switched networks, such as the internet etc., transmission errors are typically packet losses (due to congestion in network elements). In circuit-switched networks, such as mobile networks (e.g. HSCSD for GSM), transmission errors are typically bit errors where a '1' is corrupted to '0' or vice versa.

To impede degradations in images introduced by transmission errors, retransmissions can be used, error detection and/or error correction methods can be applied, and/or effects from the received corrupted data can be concealed. Normally retransmission provides a reasonable way to protect video data streams from errors, but large round-trip delays associated with low bit-rate transmission and moderate or high error rates make it practically impossible to use retransmission, especially with real-time videophone applications. Error detection and correction methods usually require large transmission overheads since they add some redundancy to the data. Consequently, for low bit-rate applications, error concealment can be considered as a preferred way to protect and recover images from transmission errors. Video error concealment methods are typically applicable to transmission errors occurring through packet loss and bit corruption.

H.263 is an ITU-T recommendation of video coding for low bit-rate communication which generally means data rates below 64 kbps. The recommendation specifies the bitstream syntax and the decoding of the bitstream. Currently, there are two versions of H.263. Version 1 consists of the core algorithm and four optional coding modes. H.263 version 2 is an extension of version 1 providing twelve new negotiable coding modes. H.263 is currently one of the most-favoured coding methods proposed for mobile wireless applications, where the bit rate is of the order of 28.8 bits per second and Quarter Common Intermediate Format (QCIF) pictures of 176×144 pixels are usually used. Currently the expected bit rates for third generation wireless products is around 64 kbps and the image resolution may be higher.

Pictures are coded as luminance (Y) and two colour difference (chrominance) components ($C_B$ and $C_R$). The chrominance pictures are sampled at half the resolution of the luminance picture along both co-ordinate axes. Picture data is coded on a block-by-block basis, each block representing 8×8 pixels of luminance or chrominance.

Each coded picture, as well as the corresponding coded bitstream, is arranged in a hierarchical structure with four layers, which are from bottom to top: block layer, macroblock layer, picture segment layer and picture layer. The picture segment layer can either be arranged as a group of blocks or a slice.

A block relates to 8×8 pixels of luminance or chrominance. Block layer data consists of uniformly quantised discrete cosine transform coefficients, which are scanned in zigzag order, processed with a run-length encoder and coded with variable length codes.

Each macroblock relates to 16×16 pixels of luminance and the spatially corresponding 8×8 pixels of the two chrominance components. In other words, a macroblock consists of four 8×8 luminance blocks and the two spatially corresponding 8×8 colour difference blocks. Each INTER macroblock is associated with a motion vector which defines the position of a corresponding area in the reference frame which resembles the pixels of the current INTER macroblock. The INTER macroblock data comprises coded prediction error data for the pixels' of the macroblock.

Usually, each picture is divided into segments known as groups of blocks (GOBs). A group of blocks (GOB) for a QCIF (Quarter Common Intermediate Format) picture typically comprises one row of macroblocks (i.e. 11 macroblocks). Data for each GOB consists of an optional GOB header followed by data for the macroblocks within the GOB.

If the optional slice structured mode is used, each picture is divided into slices instead of GOBS. A slice contains a number of consecutive macroblocks in scan-order. Data for each slice consists of a slice header followed by data for the macroblocks of the slice.

The picture layer data contain parameters affecting the whole picture area and the decoding of the picture data. The coded parameter data is arranged in a so-called picture header. In QCIF format a picture is divided into 176×144 pixels which corresponds to 9 rows of 11 macroblocks.

Picture and GOB (or slice) headers begin with a synchronisation or start code. No other code word or a legal combination of code words can form the same bit pattern as the synchronisation codes. Thus, the synchronisation codes can be used for bitstream error detection and for resynchronisation after bit errors.

H.263 is the video compression standard used in the ITU-T Recommendation H.324 "Terminal for Low Bit-Rate Communication" February 1998, which defines videophone communication over PSTN and mobile networks. When a connection is run over a wireless channel, it is likely that the received bitstream contains transmission errors. In a H.263 video bitstream, these errors are extremely harmful if they occur in picture headers. Such an error may prevent the decoding of the picture contents. Errors in INTRA picture headers cause the most severe implications, since these pictures are used as initial temporal prediction sources. Errors in an INTRA picture header detrimentally affect the corresponding decoded INTRA picture and each subsequent picture initially predicted from this INTRA picture.

SUMMARY OF THE INVENTION

According to the invention there is provided a method of video encoding and decoding as claimed in the appended claims. An encoder and a decoder are also provided as claimed in the appended claims.

A first embodiment of the invention introduces a novel method to repeat INTRA picture headers in video bitstreams, which is fully compliant with the ITU-T H.263 recommendation. The invention introduces redundant copies of picture headers in the bitstream. If the primary picture header is corrupted, a decoder may use a copy of it to enable the decoding of the picture contents. This invention introduces an INTRA picture header repetition method that uses the standard syntax and semantics of H.263. Therefore, all standard compliant decoders can utilise the method.

The inclusion of a repeat of the picture header for at least INTRA-frames means that a receiving decoder does not necessarily have to freeze the display, send a repeat request to the encoder and wait for the encoder to send the repeated information. Thus annoying pauses due to picture freezing are avoided and an end-user should perceive better quality video.

The invention is applicable to real-time applications and also to non-real-time applications, such as retrieval services which may not be able to respond to INTRA repeat requests from a receiving decoder.

BRIEF DESCRIPTION OF THE DRAWINGS

The invention will now be described, by way of example only, with reference to the accompanying drawings, in which.

DETAILED DESCRIPTION OF THE INVENTION

Further description of the invention will be made with reference to the H.324 and H.263 recommendations. However it is not the intention to limit the application of the invention to these or related protocols.

Figure 1:
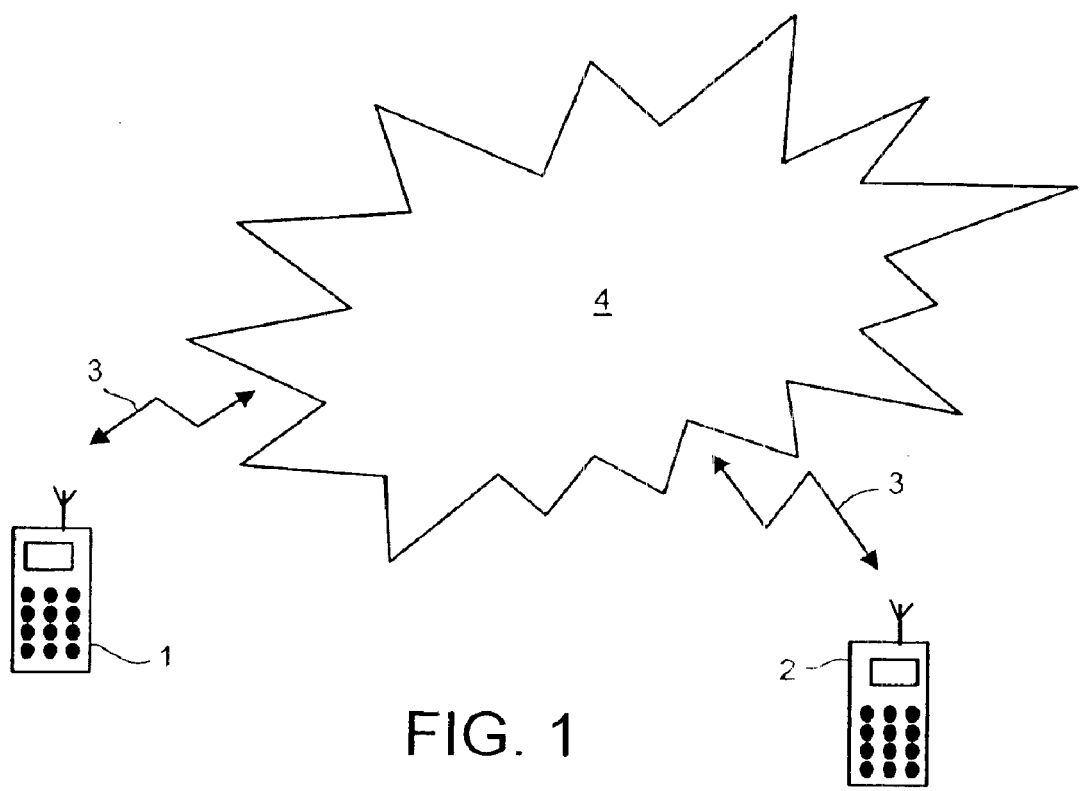
FIG. 1 shows a multimedia mobile communications system.

FIG. 1 shows a typical multimedia mobile communications system. A first multimedia terminal 1 communicates with a second multimedia terminal 2 via a communications link 3 and a communications network 4. Control data is sent between the two terminals 1, 2 as well as multimedia data. In the embodiments of the invention to be described, the multimedia terminals 1, 2 are mobile/wireless videophones and the communications network is a mobile communications network such as a GSM network. The communications link 3 in this arrangement is a radio link. In other embodiments of the invention, the multimedia terminals may both be Public Switched Telephone Network (PSTN) videophones or one may be a mobile multimedia terminal and one may be a PSTN multimedia terminal. The terminals 1,2 may be used for real-time application such as video-telephony or for non-real-time applications such as retrieval services.

Figure 2:
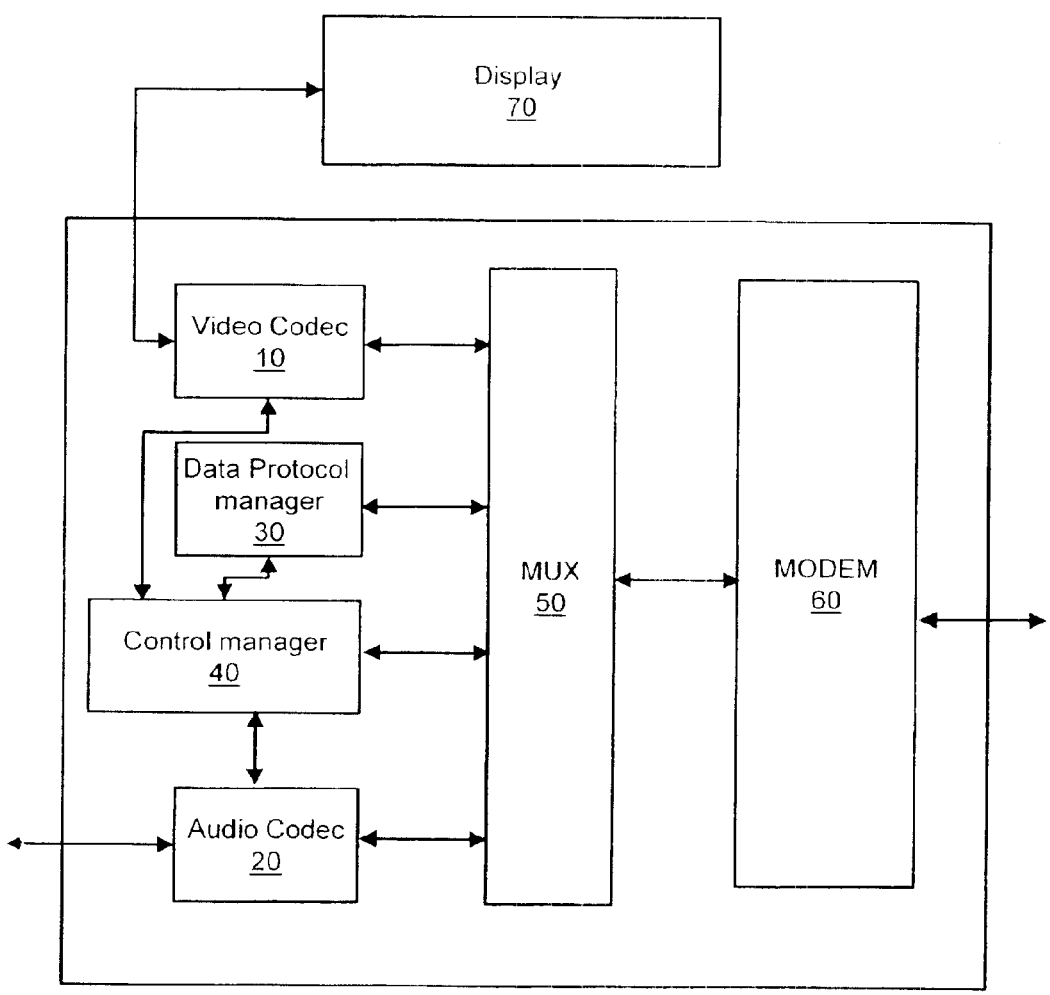
FIG. 2 shows an example of the multimedia components of a multimedia terminal.

FIG. 2 shows the typical multimedia components of a terminal 1 which conforms to H.324. The terminal comprises a video codec 10 conforming to H.263, an audio codec 20 conforming to G.723.1, a data protocol manager 30 conforming to T.120, a control manager 40 which outputs signal according to the H.245 control protocol, a multiplexer/demultiplexer 50 conforming to H.223 and a modem 60 (if required). The video codec 10 receives signals from a video capture device of the terminal (e.g. a camera (not shown)) for coding and receives signals from a remote terminal 2 for decoding and display by the terminal 1 on a display 70. The audio codec 20 receives signals for coding from the microphone (not shown) of the terminal 1 and receives signals from a remote terminal 2 for decoding and reproduction by a loudspeaker (not shown) of the terminal 1. These standards referred to above are described for exemplary purposes only and are not intended to be limiting.

The control manager 40 controls the operation of the video codec 10, the audio codec 20, the data protocol manager 30 and the multiplexer demultiplexer 50. However, since the invention is concerned with the operation of the video codec 10, no further discussion of the other parts of the terminal will be provided.

The video codec 10 receives a digital input video signal from a signal source (not shown). The video signal represents a sequence of frames where each frame is a still image. When displayed in sequence, the frames provide the impression of an image containing movement. Thus the sequence of frames are referred to herein as a moving image. The codec 10 encodes the moving image from the signal source (not shown) and decodes a received signal representing a moving image for display on the display 70.

Figure 3:
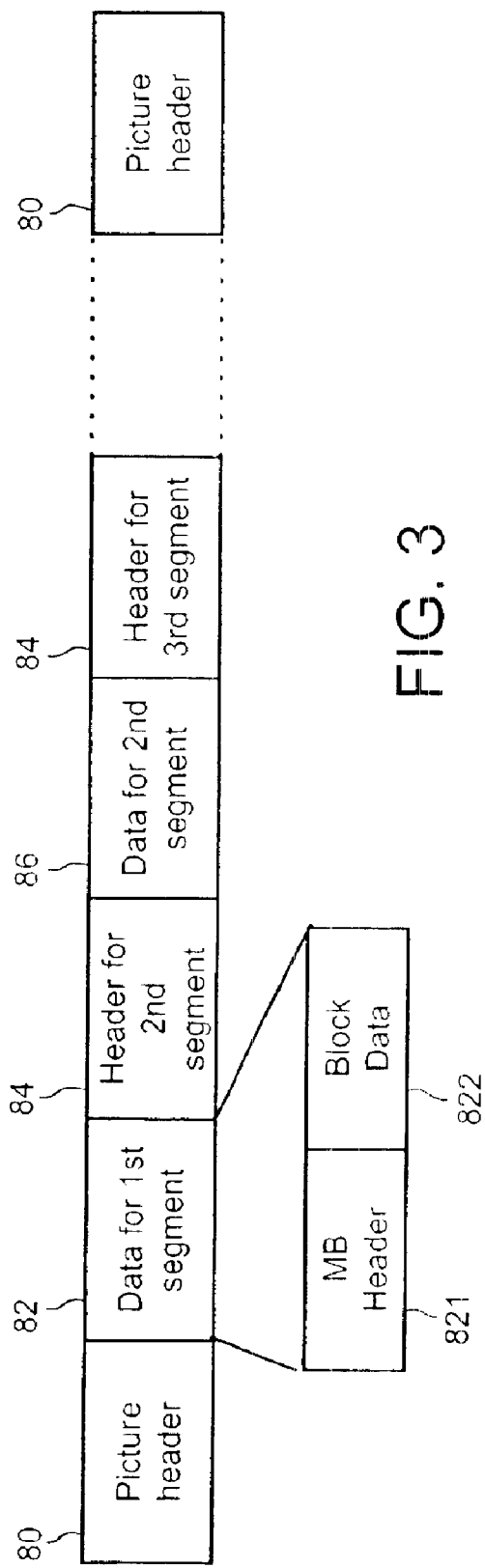
FIG. 3 shows the typical data structure of a video signal encoded according to H.263.

FIG. 3 shows the data structure for a frame (or picture) of a video signal encoded according to H.263. Each frame begins with a picture header 80, usually of around 50 bits. The picture header 80 includes:

a Picture Start Code (PSC) for synchronisation;
a Temporal Reference (TR) formed by incrementing the value of TR in the temporally-previous reference picture (e.g. I-frame) header by one plus the number of skipped or non-reference pictures since the previously transmitted reference picture;
Type Information (PTYPE) indicating, among other things, whether the frame is an INTRA frame or an INTER frame, the format of the picture (CIF, QCIF etc.); and
Quantiser information (PQUANT), which indicates the DCT quantiser to be used for the rest of the picture.

Following the picture header 80 is picture data 82 for the first segment (GOB, slice etc.) of the picture. Owing to the presence of the picture header 80, a segment header for the first segment is unnecessary. Thus the picture data 82 following the picture header 80 includes a macroblock motion vector 821 (if applicable) and block data 822.

After the data 82 for the first segment of the picture is a segment header 84 (e.g. GOB header) for the next segment. This GOB header includes:

a GOB start code (GBSC) for synchronisation;
a Group Number (GN) indicating the number of the GOB within the picture;
GOB Frame ID (GFID) which has the same value in every segment of a given picture and the same value as in the previously coded picture if the two pictures are of the same type (I, P etc.); and
quantiser information (GQUANT) indicating the quantiser to be used for the rest of the picture (unless changed subsequently in the bitstream).

The segment header 84 for the second segment is followed by the picture data 86 (i.e. macroblock motion vector (if applicable) and block data) for that segment. The frame data continues with segment headers 84 and picture data 86 until the whole frame has been encoded. A picture header 80 for the next frame is then sent.

It will be clear to a reader that the loss of a picture header can have severe effects on the decoding of a picture. The decoder will not be able to synchronise to the picture, will not know how the picture has been encoded (I or P), etc. Conventionally, when the picture header is corrupted, the whole of the data is discarded and a request for an INTRA picture update is sent to the transmitting device. In response, the transmitting device codes a frame in INTRA mode and the current picture is frozen on the display until this new INTRA-coded data is received and decoded.

Figure 4:
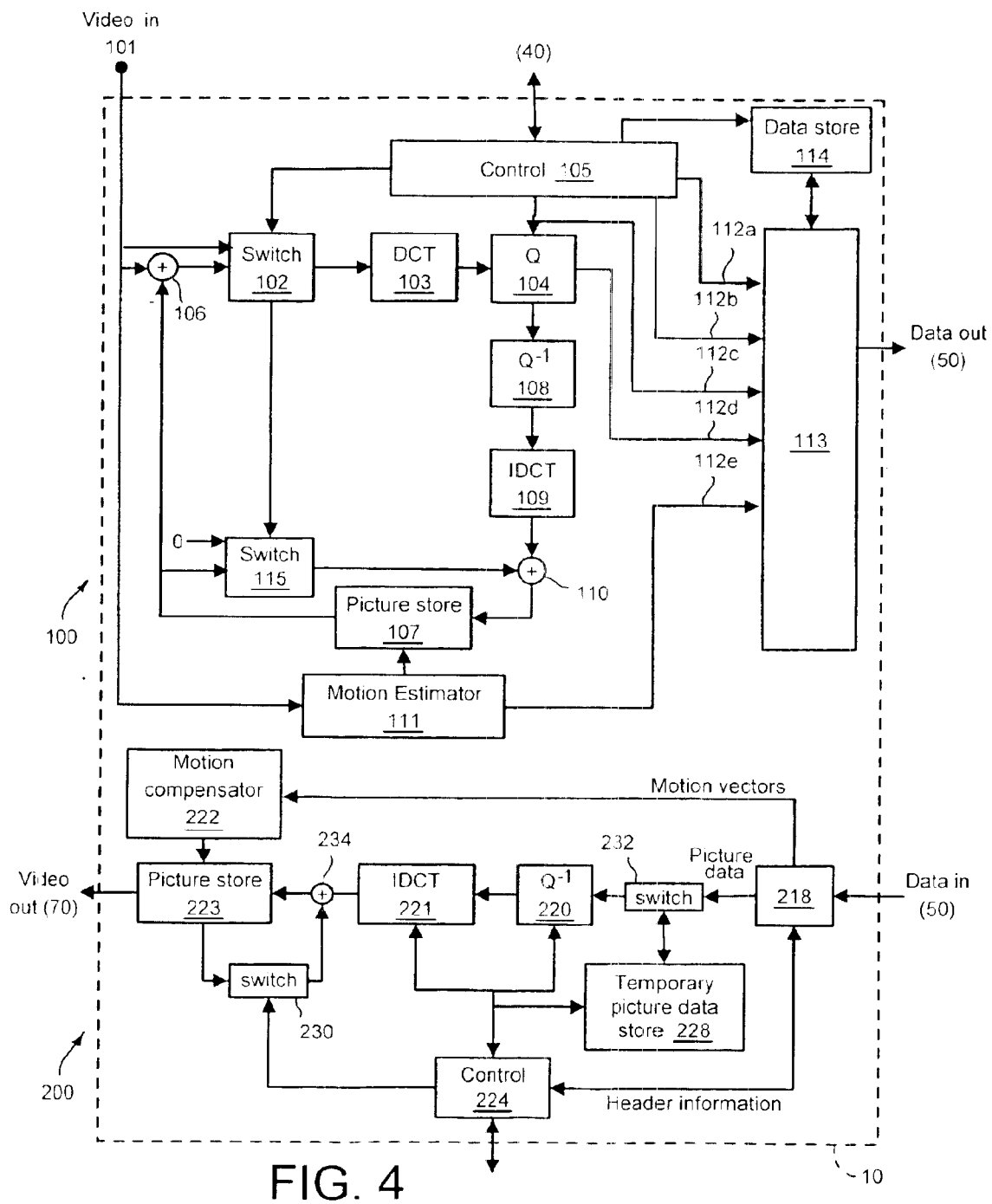
FIG. 4 shows an example of a video codec according to the invention.

FIG. 4 shows an example of a video codec 10 according to the invention. The video codec comprises an encoder part 100 and a decoder part 200.

Considering the terminal 1 as transmitting coded video data to terminal 2, the operation of the video codec 10 will now be described with reference to its encoding role. The encoder part 100 comprises an input 101 for receiving a video signal from a camera or video source (not shown) of the terminal 1. A switch 102 switches the encoder between the INTRA-mode of coding and the INTER-mode.

In INTRA-mode, the video signal from the input 101 is input directly to a DCT transformer 103 which transforms the pixel data into DCT coefficients. The DCT coefficients are then passed to a quantiser 104 which quantises the coefficients. Both the switch 102 and the quantiser 104 are controlled by an encoding control manager 105 of the video codec which also receives feedback control from the receiving terminal 2 by means of the H.245 control manager 40. The data output from the quantiser 104 is passed through an inverse quantiser 108 and an inverse DCT transformer 109. The resulting data is added to the contents of a picture store 107 by adder 110. In INTRA mode, the switch 115 is opened so that the contents of the picture store 107 are overwritten by the output of the inverse DCT transformer 109.

In INTER mode, the switch 102 is operated to accept from a subtractor 106 the difference between the signal from the input 101 and a previous picture which is stored in the picture store 107. The difference data output from the subtractor 106 represents the prediction error between the current picture and the previous picture stored in the picture store 107. The prediction error is DCT transformed and quantised. The data in the picture store 107 is then updated by passing the data output by the quantiser 104 through the inverse quantiser 108 and the inverse DCT transformer 109 and adding the resulting data to the contents of the picture store 107 by adder 110, the switch 115 being closed. A motion estimator 111 may generate motion compensation data from the data in the picture store 107 in a conventional manner.

The video coder 100 produces header information (e.g. a temporal reference flag TR 112a to indicate the number of the frame being coded, an INTRA/INTER flag 112b to indicate the mode of coding performed (I or P/B), a quantising index 112c (i.e. the details of the quantiser used), the quantised DCT coefficients 112d and the motion vectors 112e for the picture being coded. These are coded and multiplexed together by the variable length coder (VLC) 113. The output of the encoder is then multiplexed with other signals by multiplexer 50.

In a first embodiment of the invention, the encoder is arranged to send repeats of the picture header after every INTRA frame. A data store 114 is therefore provided to store temporarily the data to be repeated. In the first embodiment, for every INTRA frame, the picture header 80 and the first segment of data 82 are repeated for transmission to a receiving decoder. Thus the encoder outputs data in the form shown in FIG. 5.

Figure 5:
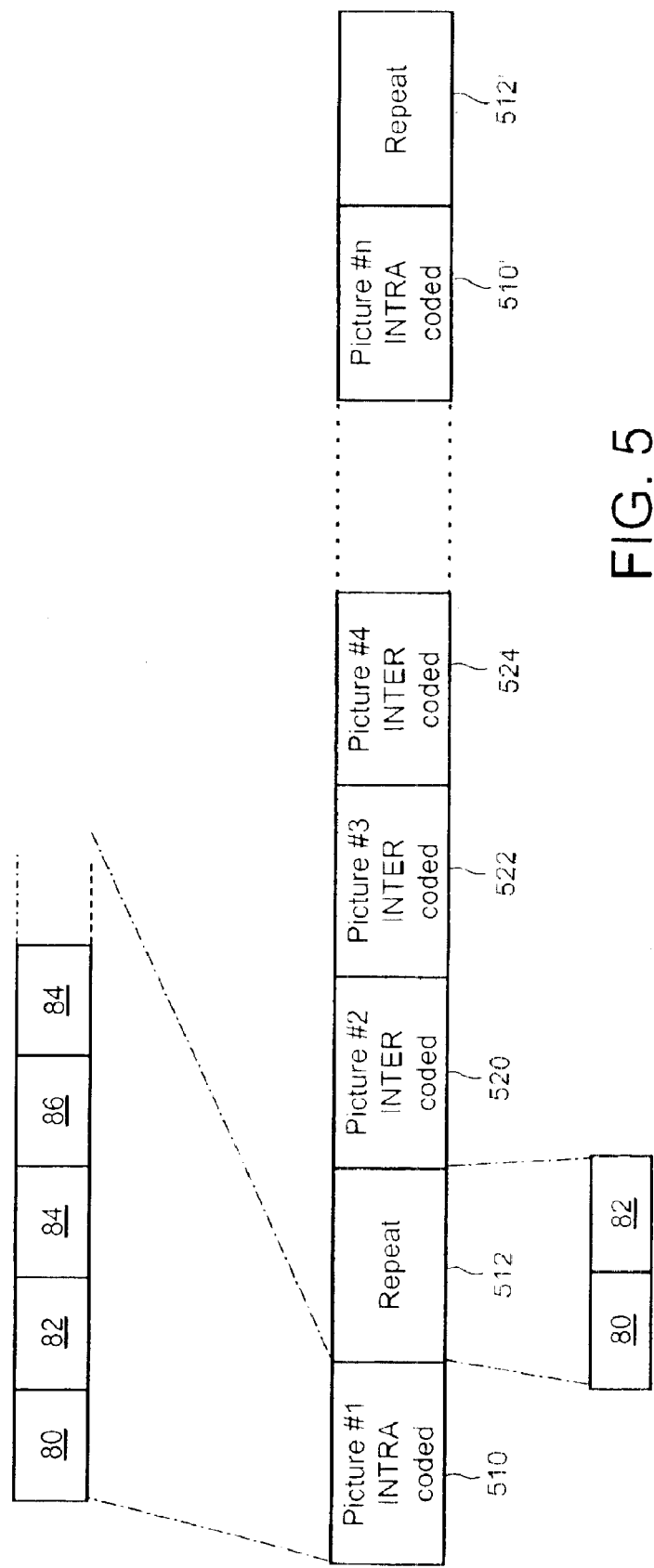
FIG. 5 shows the data structure of an encoded video signal output by an encoder according to a first embodiment of the invention.

As shown in FIG. 5, the coded signal begins with the data for the first picture 510 of the video signal. This frame is INTRA coded. The data comprises the picture header 80, the data for the first segment 82 and headers 84 and data 86 for subsequent segments of the first picture. The picture header 80 and the data 82 for the first segment of the first picture 510 are then repeated as data 512, the repeated picture header having the same temporal reference TR as the original frame. This repeated data is followed by data for subsequent INTER-coded frames 520, 522, 524. When the next INTRA frame is coded, the data 510' for the frame is followed by a repeat 512' of the picture header 80 and first segment data 82 for the INTRA frame 510'.

This arrangement leads to an overhead of around 227 bytes per INTRA-frame for a 28.8 kbps connection and a QCIF picture.

The receiving decoder will therefore receive a duplicate of the header information. In this scenario, the decoder is arranged to operate as described in Annex N of H.263 with reference to the Reference Picture Selection (RPS) mode. According to H.263 Annex N, if a decoder receives two or more picture headers having the same Temporal Reference (TR), then the second and subsequent picture headers (and their related data) are ignored by the decoder. Thus, if a receiving decoder manages to correctly decode the first occurrence of the picture header (and thus read the TR of this header), the decoder will ignore the repetition of the picture header. Thus an encoder according to the first embodiment of the invention will be operable with a conventional decoder, although such an arrangement will not result in the benefits of the invention. Compatibility is however provided.

In the first embodiment described above, the repeated data relates to an incomplete part of a frame and in particular to the picture header and the data for the first segment of the picture. A decoder according to the invention therefore detects the presence of repeated data by detecting that data for an incomplete frame has been received and uses stored data to complete the frame.

In a second embodiment of an encoder according to the invention, redundant video frames are added to the encoded bit stream. Such a redundant frame is not used to bring any additional information to the transmitted video sequence. Instead the redundant frame is used to repeat the picture header of a previous picture. The redundant frames are added to the video bitstream by an encoder according to the invention. The presence of a redundant frame is explicitly signalled to a decoder or the decoder may use implicit characteristics of the redundant frames to detect the presence of a such redundant frame.

Figure 6:
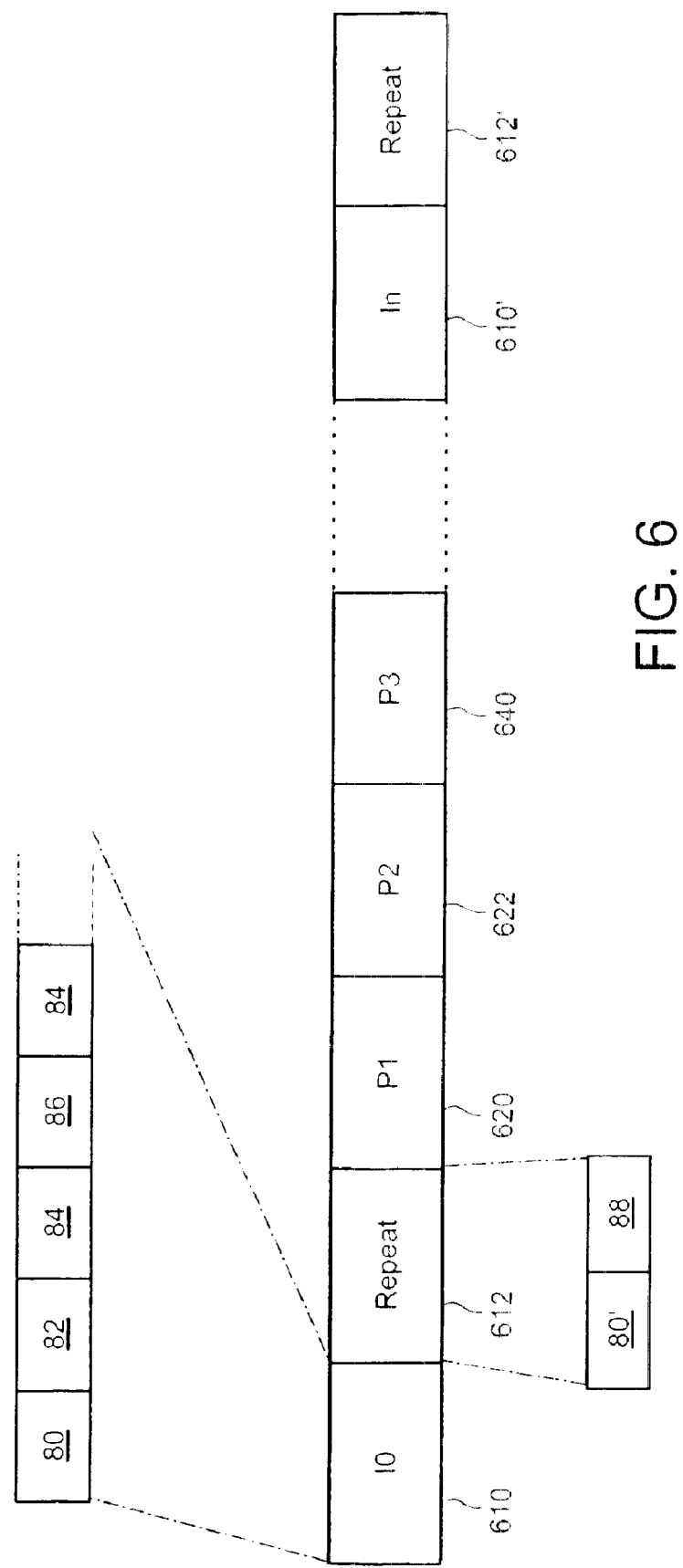
FIG. 6 shows the data structure of an encoded video signal output by an encoder according to a second embodiment of the invention.

FIG. 6 shows the framing structure of a signal output by an encoder according to the second embodiment of the invention. The encoder is arranged to generate and send a redundant frame 612 after each INTRA frame 610. According to H.263, consecutive compressed pictures cannot represent the same uncompressed picture unless the Reference Picture Selection (RPS) mode is selected (Annex N). The second embodiment of the invention does not rely on RPS being selected. In this case, the picture header only is stored in the data store 114. Under control of the control 105 the original picture header 80 is altered such that the new picture header 80' is the same as that for the INTRA frame 610 except that the picture coding type in the PTYPE field is changed from 1 to P and the TR field is incremented. The control 105 also sets a field 88 which indicates that there has been no change to the data for the whole frame. In H.263 this field includes a Coded Macroblock Indication (COD) flag, which is set in respect of a macroblock that is INTER-coded and, when set, indicates that no further information is sent for the macroblock (i.e. no-change). Subsequent INTER-frames 620, 622, 624, encoded in the same manner as frames 520, 522, 524 shown in FIG. 5, are transmitted until the next INTRA-frame 610'.

According to another embodiment of the invention, redundant frames are included after INTER-frames as well as INTRA-frames.

The redundant frame of repeated data 612 contains a picture header 80' of around 50 bits, 99 COD bits (one for each of the 99 macroblocks within a QCIF picture) and some stuffing bits to make up an integer number of bits for a complete frame. Altogether such a redundant frame typically consists of 19 bytes and thus adds around 8% of overhead to the data stream for a 28.8 kbps H.263 connection and a QCIF picture. This overhead value applies only if each INTRA frame and each INTER frame is associated with a redundant frame. Clearly the overhead may be reduced if a redundant frame is encoded after each INTRA frame only.

As described with reference to FIGS. 5 and 6, the repeated picture header for a frame is provided subsequent to the original data for the frame of a picture and prior to data for the next frame.

A third embodiment of the encoder will now be described. This embodiment is based on a new addition to the Supplemental Enhancement Information field (Annex L) of H.263. The addition enables repetition of certain picture layer fields of the previous picture in the supplemental enhancement information fields of the current picture. (Picture layer fields are not repeated within the same picture since they are in danger of being corrupted at the same time as the picture layer data itself.)

The inclusion of Supplemental Enhancement Information in a picture header is indicated, according to H.263, by a flag PEI. If PEI is set, this indicates that supplementary information follows in an 8-bit field PSUPP. A further PEI indicates that a further PSUPP field follows with further information and so on.

Decoders which do not support the extended capabilities described in Annex L are designed to discard PSUPP if PEI is set to 1. This enables backward compatibility for the extended capabilities of Annex L so that a bitstream which makes use of the extended capabilities can also be used without alteration by decoders which do not support those capabilities.

Annex L of H.263 describes the format of the supplemental enhancement information sent in the PSUPP field of the picture layer of this Recommendation. The presence of this supplemental enhancement information is indicated in PEI, and an additional PEI bit is inserted between every octet of PSUPP data.

The PSUPP data consists of a four-bit function type indication FTYPE, followed by a four-bit parameter data size specification DSIZE, followed by DSIZE octets of function parameter data, optionally followed by another function type indication, and so on. A decoder which receives a function type indication which it does not support can discard the function parameter data for that function and then check for a subsequent function type indication which may be supported. The FTYPE values which have been defined are shown in Table L.1 of H.263. This embodiment of the invention would require some changes to Annex L of H.263. These changes are:

1. the definition of a new function type indication (FTYPE) in Table L.1 of H.263 e.g. Entry 13— Picture Layer Data Repetition; and
2. the inclusion in Annex L of an explanation of the effect of this FTYPE code e.g.:

The Picture Layer Data Repetition Function shall be used to repeat certain fields of the coded representation of the picture layer data of the previous picture. The repeated fields shall appear in natural syntactic order beginning from the Temporal Reference (TR) field. In other words, if the PEI bits were removed from the repeated picture layer data, the bit stream of the repetition would be exactly the same as the original bit stream in the corresponding position. The DSIZE field of the SEI indicates the number of repeated bytes. A DSIZE equal to zero is reserved for future use. The picture header information then follows the FTYPE/DSIZE octet.

This proposed method introduces a considerable delay compared with the previous embodiments when recovering a corrupted picture header, since the recovery cannot take place until the beginning of the next picture is received. However, since the operation of a decoder is typically faster than real-time video-data transmission at least at low frame rates, the decoder is likely to be able to recover the time spent for waiting the next picture to arrive.

Figure 7:
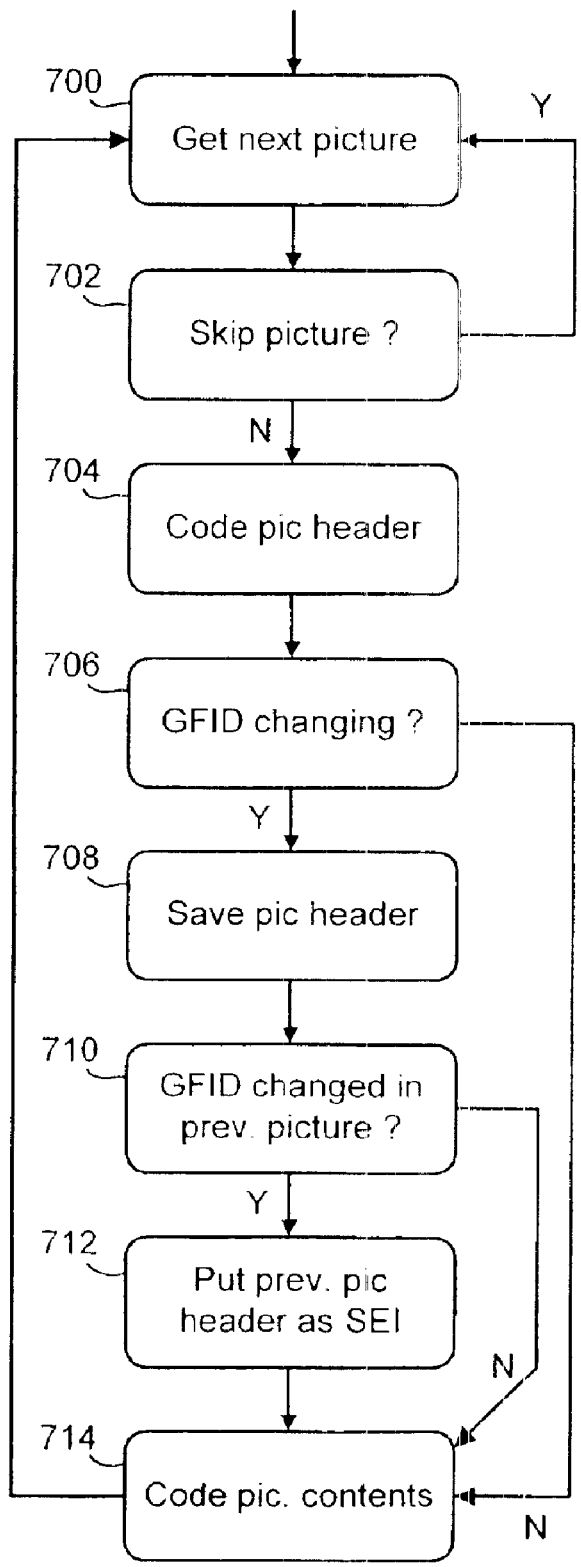
FIG. 7 is a flow diagram showing the operation of a video encoder according to a third embodiment of the invention.

One possible way to implement an encoder according to the third embodiment is presented in the flowchart shown in FIG. 7. With respect to this embodiment, picture header refers to picture layer data preceding Supplemental Enhancement Information in the bit stream syntax.

The uncompressed signal is input to the encoder (700) at a certain frame rate. A bit rate control algorithm decides whether to code or to skip a particular frame (702). If a frame is going to be coded, the picture header is coded first (704). The picture header is also stored (708) in data store 114. No more than three picture headers are needed at any moment, namely the header from the current picture and the headers from the two previous coded pictures. The encoder determines (706) whether the GFID is going to be changed in this picture (compared with the previous picture) based on the picture headers of the current and previous pictures. If the GFID of the previous picture also differed from the GFID of the picture before that (710), one needs to repeat the picture header of the previous picture as Supplemental Enhancement Information. Otherwise, the receiver can recover the picture header of the previous picture (712) using the GFID of either the current picture or the picture preceding the previous picture. Finally, the rest of the picture is encoded (714). Then the coding loop continues from the beginning (700).

The repeated picture header may be repeated without the PSC. Alternatively the header could be manipulated by a systematic error-correcting code. A systematic error-correcting code is such that k first symbols are the actual message and the rest of the symbols are used for error checking. In this particular case, k first bits are the picture header, and the rest of the bits are transmitted as Supplemental Enhancement Information in the next frame. Consequently, the selection of the error-correcting code affects how many bit inversion errors can be detected and corrected and how many supplemental bits are needed to provide this error protection.

In the embodiments of the encoder 100 described above the encoder has been pre-programmed to send picture header repeats. However the encoder 100 can be arranged additionally to repeat or refresh the picture data in response to a command from a decoder.

Additionally or alternatively the encoder may be arranged to send a repeat picture header every time the GFID parameter changes state.

Considering the terminal 1 as receiving coded video data from terminal 2, the operation of the video codec 10 according to the invention will now be described with reference to its decoding role. The terminal 1 receives a multimedia signal from the transmitting terminal 2. The demultiplexer 50 demultiplexes the multimedia signal and passes demultiplexed signals to the correct parts of the receiver e.g. the video data to the video codec 10, the audio data to the audio codec 20 and H.245 control data to the H.245 control 40. The decoder 200 of the video codec decodes the encoded video data by inverse quantising, inverse DCT transforming and motion compensating the data. The decoded video data is then output for reproduction on a display 70 of the receiving terminal 1.

As shown in FIG. 4, the decoder part 200 of the video codec 10 comprises a variable length decoder 218, an inverse quantiser 220, an inverse DCT transformer 221, a motion compensator 222, a picture store 223, a controller 224, a temporary picture data store 228 and switches 230 and 232. The controller 224 receives video codec control signals demultiplexed from the encoded multimedia stream by the demultiplexer 50. In practice the controller 105 of the encoder and the controller 224 of the decoder may be the same processor.

The controller 224 of the decoder checks the integrity of the received data. An error in the picture header may mean that the picture cannot be decoded and is lost completely or it is so corrupted that it is effectively lost.

A first embodiment of the decoder will now be described. In normal operation, the decoder 200 receives encoded data. The Variable Length Decoder (VLD) 218 decodes the received data in an attempt to reproduce the original frame structure which has a format such as shown in FIG. 3. That is to say, the VLD 218 decompresses the encoded data and the controller 224 detects the Picture Start Code (PSC) within the received data. The controller 224 then uses the information within the picture header to control the inverse quantiser 220 and the switch 230. When the PTYPE information indicates an INTRA-frame, the switch 230 is opened and the output of inverse DCT device 221 is input to the picture store 223. When the PTYPE information indicates an INTER-frame, the switch 230 is closed and the contents of the picture store 223 are added to the output of the inverse DCT device 221 (the decoded prediction error) by adder 234.

If the decoder is unable to decode the first picture header, but is able to detect other segments of the picture (e.g. the GBSC of the second segment 84) then the decoder stores this data in the temporary picture data store 228. When the decoder receives, decodes and identifies the repeated header data (and the first segment data 82), the decoder then uses the data in the temporary picture store to reproduce the rest of the picture.

Thus, if the controller 224 does not detect a PSC at the start of a frame (or otherwise determines that the picture header is corrupted) but does detect a segment header (e.g. by detecting a GOB start code GBSC), the controller 224 changes the status of switch 232 such that the data output from VLD 218 is input to the temporary picture data store 228. This data will start from the detected GBSC code since the VLD will not be able to synchronise to the start of the picture.

Referring to FIG. 5, let us assume that the decoder has detected the GBSC in the header 84 for the second segment of frame 510. The data stored in the temporary picture data store 228 therefore comprises header 84 onwards i.e. the header for the second segment, data for the second segment, the header for the third segment, data for the third segment etc of frame 510.

If the lost/corrupted picture header belonged to an INTRA-frame, the next data received by the decoder will therefore be the repeated picture header and first segment data 512. The decoder receives the data 512 relating to the repeated picture header 80 and repeated first segment data 82. The controller detects the PSC in the repeated data 512, reads the PTYPE field in the header and then instructs the quantiser 220 as to the quantiser to be used and opens switch 230 in response to the PTYPE field in the header indicating an INTRA frame. The rest of the repeated information (i.e. the repeated first segment of the data) is decoded by the inverse quantiser 220 and the IDCT transform 221 and the decoded repeated first picture segment is output from IDCT 222 to the picture store 223.

The decoder recognises that the data is not for a whole picture i.e. it is only a picture header 80 followed by picture data 82 for a first segment followed by a picture header for a subsequent frame, by for instance, the decoder decoding the repeated data 512 and then detecting that the subsequent start code is for a different frame i.e. frame 520. In response to this detection by the decoder, the controller 224 alters the status of switch 232 such that the data from frame 510 stored in the temporary picture store 228 is output to the inverse quantiser 220 and the IDCT transform 221. The decoded data is then output to the picture store 223 to update the contents of the picture store with the rest of the decoded data for the current picture.

As mentioned above, in the first embodiment of a decoder according to the invention, the decoder detects the receipt of a repeated picture header by detecting the occurrence of a picture header which is not followed by data for a whole picture (e.g. a picture followed by data for one segment of the picture but no more). Other ways could be used to detect the repetition of header information.

As explained earlier, if the decoder is able to decode the frame 510 correctly, the decoder simply discards the repetition of the header 512 when the signal is formatted as shown in FIG. 5.

Figure 8:
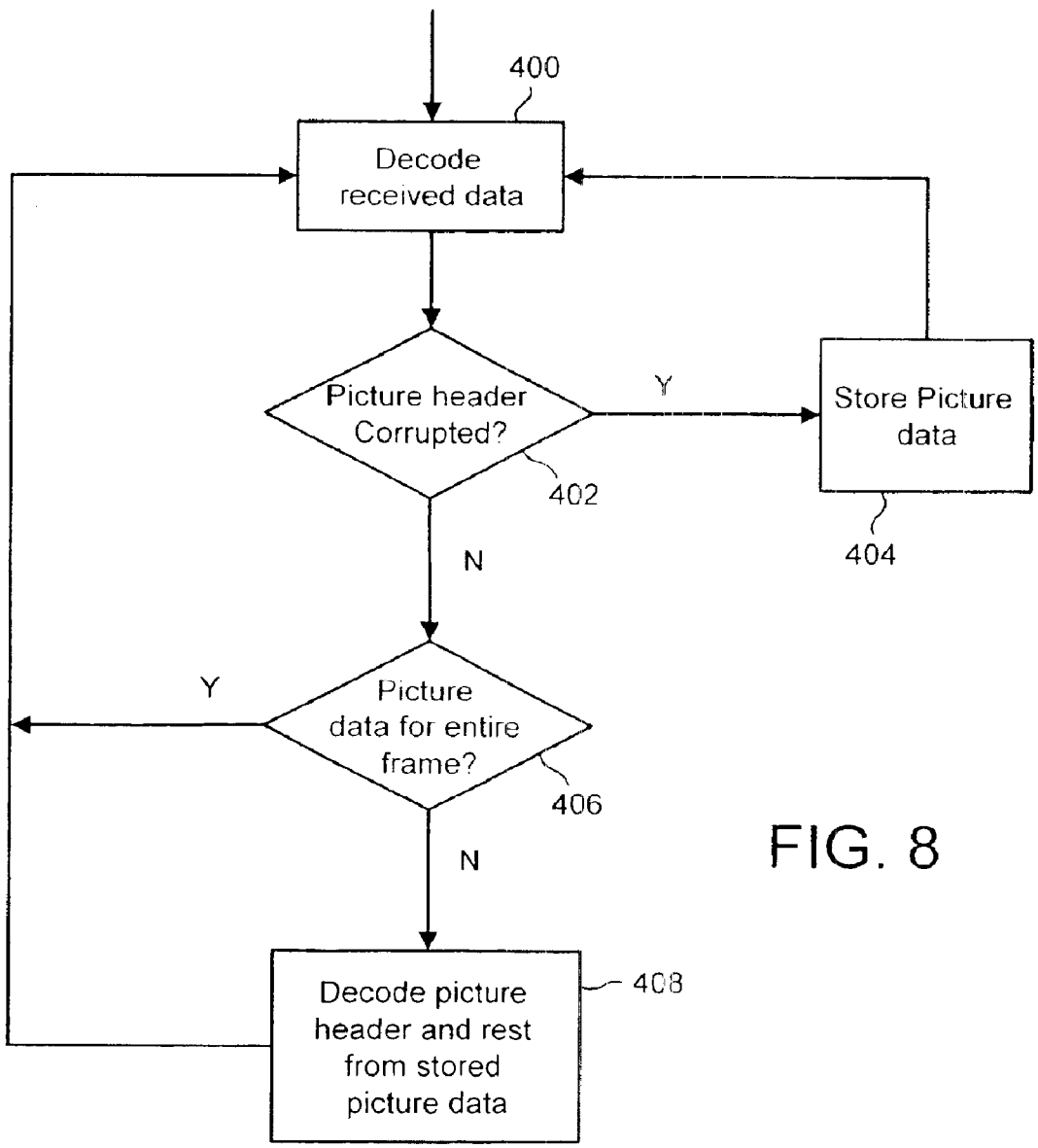
FIG. 8 is a flow diagram showing the operation of a video decoder according to a first embodiment of the invention.

FIG. 8 shows a flow diagram illustrating a method of operating a decoder according to the first embodiment of the invention. Firstly (400) the decoder 200 starts to decode a received signal by checking if a picture start code (PSC) is the next code in the incoming data. If the picture header is deemed to be corrupted (402), the controller stores (404) the picture data associated with the remaining segments of the picture in the temporary picture data store 228.

Various ways may be used to determine if the picture is corrupted. Some exemplary methods are if the decoder cannot detect the PSC, or if an error detection method (such as H.223 CRC checksum) indicates that there is an error, or if an unlikely parameter is found in the picture header (e.g. an INTER flag is set within a segment header when the coding type of the picture header is INTRA).

The decoder 200 then seeks the next error-free header. If this header is for an INTRA frame, the decoder tries to decode the frame. If it is found that some of the picture segments are missing, the corresponding segments of the previous frame are read from the temporary picture store 228 and decoded. If the lost/corrupted picture header belonged to an INTRA-frame, the next data received by the decoder will therefore be the repeated picture header and first segment data 512. The decoder decodes (408) the picture header and the data for the first segment of the picture. The decoder detects (406) that the data is not for an entire frame and, in response, the decoder then decodes (408) the data stored in the temporary picture data store 228 on the basis of this repeated picture header.

Normal error concealment techniques may then be used to conceal errors within the picture which have arisen from transmission or decoding errors. As is conventional, the decoder may also send an update request to the encoder if the decoded frame is considered too erroneous.

A conventional decoder, on receiving an incomplete frame of data, would conclude that the missing data has been lost in transmission. Thus the decoder would request an INTRA picture request in the known manner. Thus an encoder according to the invention can operate with a decoder that is not in accordance with the invention.

A second embodiment of a decoder according to the invention will now be described. With reference to a signal formatted as shown in FIG. 6, if the decoder is unable to decode the original header of frame 610, the decoder stores the remaining picture data (84, 86) for the frame in the temporary picture store 228. The first segment of the frame is not stored because it cannot be identified by the decoder. When the redundant frame 612 is received, the decoder reads the data as being INTER coded but with no change. An encoder according to the prior art would not usually supply this information (it being apparently 100% redundant). A decoder according to the invention detects the receipt of a repeated picture header by detecting the occurrence of an INTER picture header followed by a field indicating no-change. On receipt of such data, the decoder uses the INTER picture header to configure the decoder and then decodes the information from the previous frame, stored in the store 228.

In this embodiment, the data for the first segment of the picture is not repeated and may therefore be considered to be lost. The decoder, on receipt of the repeated header data, therefore causes the switch 232 to alter status such that the contents of the picture data are refreshed from the second segment onwards. Alternatively, the decoder may be able to estimate where the first segment picture data should begin in the corrupted data and decode the data from that point. For instance, let us assume that there is a one bit inversion error in the picture header of the original picture and therefore the picture header cannot be decoded. However the PSC is still valid and the start of the frame can therefore be detected reliably. The whole picture 610 is therefore stored in the temporary picture store 228 and then when the repeated header is received, the decoder 200 starts to decode the stored data at the position where the picture header is expected to end and where the data for the first segment is expected to begin.

Thus, the decoder inspects the incoming data. If the picture header is lost or corrupted, the data for the remainder of the frame is stored in the temporary picture data store 228. Subsequent data is then decoded and if the data relates to an INTER-frame and indicates that there is no change in the picture, the picture header is decoded and the data from the temporary picture data store 228 is decoded using the information in the picture header of the redundant frame.

When the signal is formatted as shown in FIG. 6, if the decoder manages to correctly decode the picture header of frame 610, the decoder will continue and decode the repetition of the header 612. As described with reference to FIG. 6, the repeated information 612 comprises the picture header 82 (including an incremented TR) and a field 88 indicating that none of the data has changed with respect to the previous coded frame. Since there is no data stored in the temporary picture data store 228, the decoder will discard the redundant frame of data 612 and decode the subsequent frame 620.

On receipt of a signal encoded according to the third embodiment of the invention, a decoder according to the invention uses the data following the FTYPE/DSIZE octet of the Supplemental Enhancement Information in the subsequent frame to decode the data stored in the temporary picture store 228.

Figure 9:
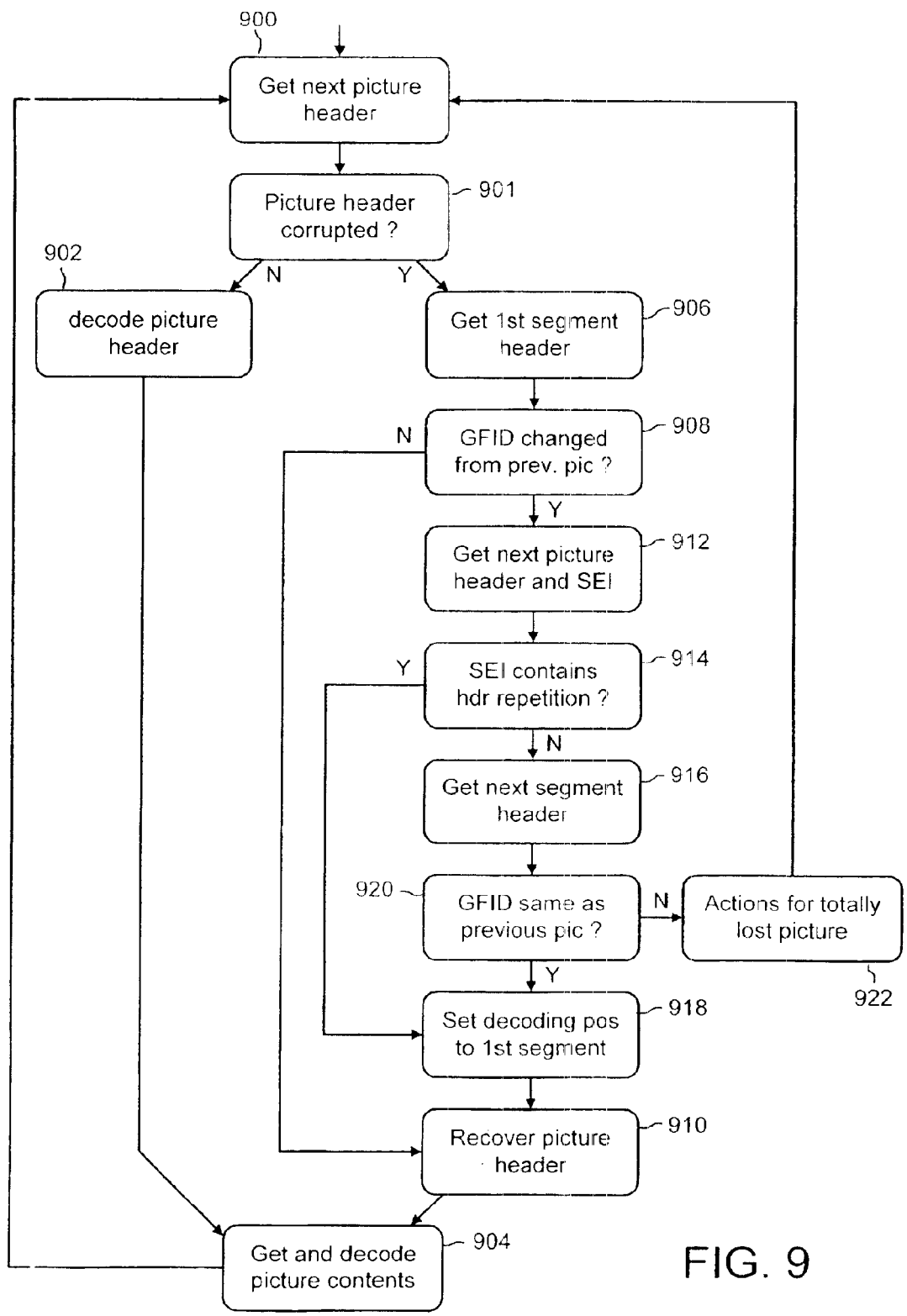
FIG. 9 is a flow diagram showing the operation of a video decoder according to a third embodiment of the invention.

The third embodiment of the decoder will now be described with reference to FIG. 9. This embodiment makes use of the SEI method as described earlier with reference to the encoder and FIG. 7.

The decoder operates as follows. At first (900), the decoder receives the picture header of the next transmitted picture. If the header is free from errors (901), the decoder can decode the header without problems (902). Then, it can continue to decode the rest of the picture (904). If some errors were detected in the picture header (901), the decoder searches (906) for the first error-free picture segment (GOB or slice) header of the picture. Let us call this bit stream position as the first resynchronisation position. If the GFID of that header is the same as in the previous picture (908), the decoder can recover the crucial parts of the picture header (910) and continue decoding (904), starting from that particular picture segment. If the GFID differs from the one in the previous picture (908), the decoder searches (912) for the next picture start code. If the picture layer data of that picture contains SEI picture header repetition (914), the decoder can recover the picture header of the current picture (916). It must also set the decoding position in the bit stream back to the first resynchronisation position (918). If the picture layer data does not contain SEI picture header repetition, the decoder searches for the next picture segment start code and checks (920) if the GFID in the header is the same as the GFID of the picture that is being decoded. If the GFIDs are equal, the decoder can recover the picture header (910) and continue decoding from the first resynchronisation position. If the GFIDs are different from each other, the decoder has no means to recover the corrupted picture header. In this case (922), it can request for an INTRA update, for example.

The temporary picture store may store coded data for a plurality of frames. Since most frames in low bit rate applications are coded in an INTER frame manner, most of the data stored in the temporary picture data store is likely to represent prediction error data and hence be relatively compact. The temporary picture store therefore should be sufficient to store data for at least one INTRA frame and one INTER frame of data, an INTER frame typically being coded with around 250 bytes for a QCIF picture at 28.8 kbps.

If any data for subsequent frames of the video are also stored in the temporary picture data store 228, these are also decoded and output to the picture store 223 to bring the contents of the picture store 223 into alignment with the contents of the corresponding picture store of the transmitting device.

What is claimed is:

1. A method of decoding a compression encoded video signal, the method comprising:

receiving compression encoded data representative of a first frame of a video signal; and examining said compression encoded data representative of the first frame to detect picture header data and picture data; and wherein when an error in the picture header data of the first frame is detected, storing the picture data of the first frame in a temporary picture data store, receiving compression encoded data subsequent to the first frame, detecting a repeat of the picture header data of the first frame from within the compression encoded data subsequent to the first frame, and decoding the stored picture data using the repeated picture header data.

2. A method of decoding according to claim 1 wherein the step of detecting a repeat of picture header data comprises:

ascertaining whether the compression encoded data subsequent to the first frame relates to an entire frame of the video signal or to an incomplete part of a frame and detecting a repeat of picture header data of the first frame when the compression encoded data subsequent to the first frame relates to an incomplete part of a frame.

3. A method of decoding according to claim 1 wherein the step of detecting a repeat of picture header data comprises:

ascertaining whether the compression encoded data subsequent to the first frame includes picture header data and further data, which further data signifies that a frame of the video signal is unaltered with respect to a reference frame of the video signal and, if so, determining that a repeat of the picture header data of the first frame has been detected.

4. A method of decoding according to claim 1, wherein the step of detecting a repeat of picture header data is carried out each time data is stored in the temporary picture data store.

5. A method of decoding according to claim 1, wherein the step of detecting the repeated picture header data comprises examining the picture header data of a subsequent frame to determine whether the picture header data of the subsequent frame includes data relating to the picture header data of the first frame and, if so, detecting a repeat of the picture header data of the first frame.

6. A method of decoding according to claim 5, wherein the step of detecting the repeated picture header data of the first frame comprises examining Supplemental Enhancement Information (SEI) of the header of the subsequent frame.

7. A method of decoding according to claim 5, wherein the step of detecting the repeated picture header data comprises examining Supplemental Enhancement Information (SEI) of the header of a subsequent frame for a repeat of the picture header data of the first frame excluding the picture start code for the first frame.

8. A method of video decoding according to claim 1, comprising detecting a repeat of the picture header data when certain fields of the picture header data of the first frame are present in the picture header data of the subsequent frame.

9. A method of video encoding comprising:
receiving an uncompressed video signal to be compression encoded;
encoding data representing a first frame of said uncompressed video signal to form compression encoded data; and
repeating part, but not all, of said data representing the first frame within compression encoded data subsequent to the first frame, said repeated part including picture header data for the first frame.

10. A method of encoding according to claim 9, wherein part of the data is repeated only for frames which are encoded in an INTRA-frame manner.

11. A method of encoding according to claim 9, wherein the repeated data comprises picture header data and a first segment of picture data of the first frame.

12. A method of encoding according to claim 9, wherein said repeated data consists of picture header data and an indicator that no picture data has altered since a previous frame.

13. A method of encoding according to claim 9, wherein the step of repeating picture header data comprises adding the repeated picture header data to the picture header data of a subsequent frame.

14. A method of encoding according to claim 13, wherein the repeated picture header data is included in the Supplemental Enhancement Information (SEI) of the subsequent frame.

15. A method of encoding according to claim 14, wherein the repeated picture header data included in the Supplemental Enhancement Information (SEI) of the subsequent frame excludes the picture start code for the first frame.

16. A method of encoding according to claim 9, wherein repeating said data includes repeating certain fields of the picture header data of the first frame in the picture header data of a subsequent frame.

17. A video encoder comprising:
an input for receiving an uncompressed video signal to be compression encoded;
means for compression encoding data representing a first frame of said uncompressed video signal to form compression encoded data; and
the means for compression encoding data being arranged to repeat part, but not all, of said data representing the first frame within compression encoded data subsequent to the first frame, said repeated part including picture header data for the first frame.

18. An encoder according to claim 17, wherein the repeated data comprises picture header data and a first segment of picture data of the first frame.

19. An encoder according to claim 17, wherein said repeated data consists of picture header data and an indicator that no picture data has altered since a previous frame.

20. An encoder according to claim 17, wherein the encoder is arranged to repeat picture header data by adding the repeated picture header data to the picture header data of a subsequent frame.

21. An encoder according to claim 20, wherein the encoder is arranged to include the repeated picture header data in Supplemental Enhancement Information (SEI) of the subsequent frame.

22. An encoder according to claim 21, wherein the repeated picture header data included in the Supplemental Enhancement Information (SEI) of the subsequent frame excludes the picture start code for the first frame.

23. An encoder according to claim 20, wherein the encoder is arranged to include the repeated picture header data in the Supplemental Enhancement Information (SEI) of the subsequent frame excluding the picture start code for the first frame.

24. A video encoder according to claim 17, wherein the means for compression encoding data is arranged to repeat certain fields of the picture header data of the first frame in the picture header data of a subsequent frame.

25. A video decoder for decoding a compression encoded video signal, the decoder comprising:
an input for receiving compression encoded data representative of a first frames of a video signal and compression encoded data subsequent to the first frame; and
decoding means for examining said compression encoded data representative of the first frame to detect picture header data and picture data;
said decoder being arranged to store the picture data of the first frame in a temporary picture data store when an error in the picture header data of the first frame is detected, to detect a repeat of the picture header data of the first frame from within the compression encoded data subsequent to the first frame, and to decode the stored picture data using the repeated picture header data.

26. A wireless communications device incorporating an encoder according to claim 17.

27. A wireless communications device incorporating a decoder according to claim 25.

28. A decoder according to claim 25, wherein the decoder is arranged to ascertain whether the compression encoded data subsequent to the frame relates to an entire frame of the video signal or to an incomplete part of a frame, and to detect a repeat of picture header data of the first frame when the compression encoded data subsequent to the first frame relates to an incomplete part of a frame.

29. A decoder according to claim 25, wherein the decoder is arranged to ascertain whether the compression encoded data subsequent to the first frame includes picture header data and further data, which further data signifies that a frame of the video signal is unaltered with respect to a reference frame of the video signal and, if so, to determine that a repeat of the picture header data of the first frame has been detected.

30. A decoder according to claim 25, wherein the decoder is arranged to examine the picture header data of a subsequent frame to determine whether the picture header data of the subsequent frame includes data relating to the picture header data of the first frame and, if so, to detect a repeat of the picture header data of the first frame.

31. A decoder according to claim 30, arranged to detect repeated picture header data of a previous frame by examining Supplemental Enhancement Information (SEI) of the picture header of a subsequent frame.

32. A decoder according to claim 30, wherein the decoder is arranged to detect the repeated picture header data by examining Supplemental Enhancement Information (SEI) of the header of a subsequent frame for a repeat of the picture header data of the first frame excluding the picture start code for the first frame.

33. A video decoder according to claim 30, arranged to detect a repeat of the picture header data when certain fields of the picture header data of the first frame are present in the picture header data of the subsequent frame.

34. A decoder according to clam 30, wherein the decoder is arranged to detect the repeated picture header data of the first frame by examining the Supplemental Enhancement Information (SEI) of the header of the subsequent frame.

35. A decoder according to claim 30, wherein the decoder is arranged to detect the repeated picture header data of the first frame by examining the Supplemental Enhancement Information (SEI) of the header of the subsequent frame for a repeat of the picture header data of the first frame excluding the picture start code for the first frame.

36. A video codec comprising an encoder and decoder, the encoder comprising:

- an input for receiving an uncompressed video signal to be compression encoded; and
- means for compression encoding data representing a first frame of said uncompressed video signal to form compression encoded data;
- the means for compression encoding data being arranged to repeat part, but not all, of said data representing the first frame within compression encoded data subsequent to the first frame, said repeated part including picture header data for the first frame;

the decoder comprising an input for receiving compression encoded data representative of a first frame of a video signal and compression encoded data subsequent to the first frame; and decoding means for examining said compression encoded data representative of the first frame to detect picture header data and picture data;

said decoder being arranged to store the picture data of the first frame in a temporary picture data store when an error in the picture header data of the first frame is detected, to detect a repeat of the picture header data from within the compression encoded data subsequent to the first frame, and to decode the stored picture data using the repeated picture header data.

* * * * *